(12) United States Patent
Kiribayashi

(10) Patent No.: US 7,205,902 B2
(45) Date of Patent: Apr. 17, 2007

(54) VEHICLE OCCUPANT DETECTION SYSTEM

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 10/996,438

(22) Filed: Nov. 26, 2004

(65) Prior Publication Data

US 2005/0156467 A1 Jul. 21, 2005

(30) Foreign Application Priority Data

Jan. 16, 2004 (JP) ............................. 2004-009637

(51) Int. Cl.
*G08B 21/00* (2006.01)

(52) U.S. Cl. ...................... 340/667; 340/665; 340/666; 340/636.12; 307/10.1

(58) Field of Classification Search ................ 340/667, 340/665, 666, 573.1, 635, 636.12, 657, 660; 307/10.1
See application file for complete search history.

(56) References Cited

U.S. PATENT DOCUMENTS 6,257,363 B1 * 7/2001 Midorikawa et al. ....... 180/268

6,335,577 B1 * 1/2002 Baba ........................... 307/28
6,384,551 B1 * 5/2002 Watanabe .................... 318/139
7,039,503 B2 * 5/2006 Kiribayashi .................. 701/1
7,055,639 B2 * 6/2006 Kiribayashi ................. 180/271

FOREIGN PATENT DOCUMENTS

JP    A-2003-196790    7/2003

* cited by examiner

*Primary Examiner*—Daryl C Pope
(74) *Attorney, Agent, or Firm*—Oliff & Berridge, PLC

(57) ABSTRACT

In an occupant detection system, a determination section of an occupant detection ECU determines occupancy status of the seat based on loads applied to the seat. A power supply section of the ECU provides a power supply voltage lower than a battery voltage of the vehicle to load sensors and the determination section. A resistor is connected in a sensor power supply line that connects the load sensors with the power supply section. A zener diode is connected between the resistor and the power supply section through branch connection. A resistance of the resistor is predetermined so that the resistor becomes open when a short occurs and does not affect to dynamic ranges of the load sensors. A breakdown voltage of the zener diode is predetermined between the power supply voltage and a guaranteed voltage of the ECU.

7 Claims, 5 Drawing Sheets

VEHICLE OCCUPANT DETECTION SYSTEM

CROSS REFERENCE TO RELATED APPLICATION

This application is based on and incorporates herein by reference Japanese Patent Application No. 2004-9637 filed on Jan. 16, 2004.

FIELD OF THE INVENTION

The present invention relates to a vehicle occupant detection system.

BACKGROUND OF THE INVENTION

A vehicle occupant detection system having load sensors and an electronic control unit (ECU) for occupant detection is proposed in JP-A-2003-196790. The load sensors are arranged at seat rails for measuring loads applied to a seat including a weight of the seat. The ECU takes the load detected by the load sensors as load data and process the data. The ECU determines a condition of the seat, for example, the seat is occupied or vacant, and the seat is occupied by an adult or a child. A result of the determination is sent to an airbag system. An airbag ECU that controls operation of an airbag determines whether a deployment of the airbag is necessary based on the result of the determination. It adjusts air pressure of the airbag when the airbag is inflated.

A power supply section for the load sensors and a power supply section for the occupant detection ECU are separately provided. As a result, the load sensors are limited in reduction of their sizes and large areas for mounting the load sensors are required. Moreover, high manufacturing costs are required.

To solve this problem, the occupant detection system may be configured such that the load sensors and the occupant detection ECU share a power supply section. More specifically, a power supply line for the load sensors may be connected to the power supply section for the occupant detection ECU. With this configuration, the load sensor can be reduced in size by the size of the power supply section.

Battery power supply lines for connecting a battery with the occupant detection ECU and other units are generally arranged around the seat rails at which the load sensors are arranged. The power supply lines for the load sensors and the battery power supply lines are easily jammed in the seat rails when the occupant slides the seat. In such a case, the power supply lines may be shorted. A voltage at the batter power supply line measures a high voltage while a voltage at the sensor power supply line measures a five-volt constant voltage. Therefore, an excessive amount of voltage may be applied to the occupant detection ECU via the sensor power supply lines due to a potential difference between the battery power supply line and the sensor power supply line.

To reduce the excessive amount of voltage, an occupant detection system 100 shown in FIG. 6 is considered. The occupant detection system 100 includes a load sensor 101 and an occupant detection ECU. A power supply section of the occupant detection ECU is connected with the load sensor 101 via a sensor power supply line L100. A diode 104 is connected in the sensor power supply line L100. The diode 104 shuts off an excess voltage applied to the occupant detecting ECU 102 via the sensor power supply line L100.

Another occupant detection system 200 shown in FIG. 7 is considered to reduce the excess voltage. The occupant detection system 200 includes the load sensor 101 and an occupant detection ECU 201. The occupant detection ECU 201 includes a zener diode 202, the first transistor 203, the second transistor 204, and the power supply section 103. A large amount of current starts flowing into the zener diode 202 when a short occurs in the circuit. As a result, the first transistor 203 turns on and the second transistor 204 turns off. The excess voltage is shut off with operation of the zener diode 203 and the first and the second transistors 203, 204.

A power supply voltage applied to the load sensor 101 is reduced by the amount of a forward voltage of the diode 104 in the occupant detection system 100 in a normal condition, that is, no short is present. A power supply voltage applied to the load sensor 101 is reduced by the amount of a turn-on saturation voltage of the second transistor in the occupant detection system 200 in the normal condition. A dynamic range of the load sensor 101 becomes narrower as the power supply voltage becomes lower. As a result, the accuracy of the load sensor 101 in measuring load is reduced.

SUMMARY OF THE INVENTION

The present invention therefore has an objective to provide an occupant detection system that performs load measurement with high accuracy under normal conditions and has a protective function for protecting an occupant detection electronic control unit from an overvoltage. A vehicle occupant detection system of the present invention includes a load sensor and an occupant detection electronic control unit (ECU). The load sensor measures a load applied to a seat of a vehicle. The occupant detection ECU has a determination section, a power supply section, and a communication section.

The determination section determines occupancy status of the seat based on a result of the load measurement. The power supply section provides a power supply voltage lower than a battery voltage of the vehicle for the determination section and the load sensor. The communication section sends a determination result produced by the determination section to a passive safety system. The power supply section is connected to the load sensor via a sensor power supply line.

A resistor having a resistance that does not affect to a dynamic range of the load sensor is connected in the sensor power supply line. When a short occurs in the system, a large amount of current flows from a battery to the power supply section due to their voltage difference and the resistor becomes open.

A zener diode is connected between the resistor and the power supply section through branch connection. The zener diode has a breakdown voltage higher than the power supply voltage and lower than a guaranteed voltage of the occupant detection ECU. The guaranteed voltage is the minimum guaranteed operation voltage of components included in the occupant detection ECU.

The power supply voltage is applied to the load sensor by the power supply section via the sensor power supply line and the resistor under normal conditions. The resistance of the resister is set relatively small so that the resistance does not affected to a dynamic range of the load sensor and does not lower an accuracy of the load measurement. Thus, the occupant detection system performs the load measurement with high accuracy under normal conditions.

The breakdown voltage of the zener diode is set higher than the power supply voltage. Therefore, the power supply voltage is less likely to be clamped by the zener diode and the power supply voltage applied to the load sensor remains stable at a proper level under normal conditions. When a short occurs, a large amount of current flows into the zener diode via the sensor power supply line and the resistor. However, an excess voltage higher than the guaranteed voltage is less likely to be applied to the occupant detection ECU because the breakdown voltage of the zener diode is set lower than the guaranteed voltage. Moreover, the occupant detection ECU is protected from the excess voltage by the resistor that become open due to the large amount of current. As a result, the occupant detection ECU is protected from the excess voltage even when a short occurs.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings.

Figure 1:
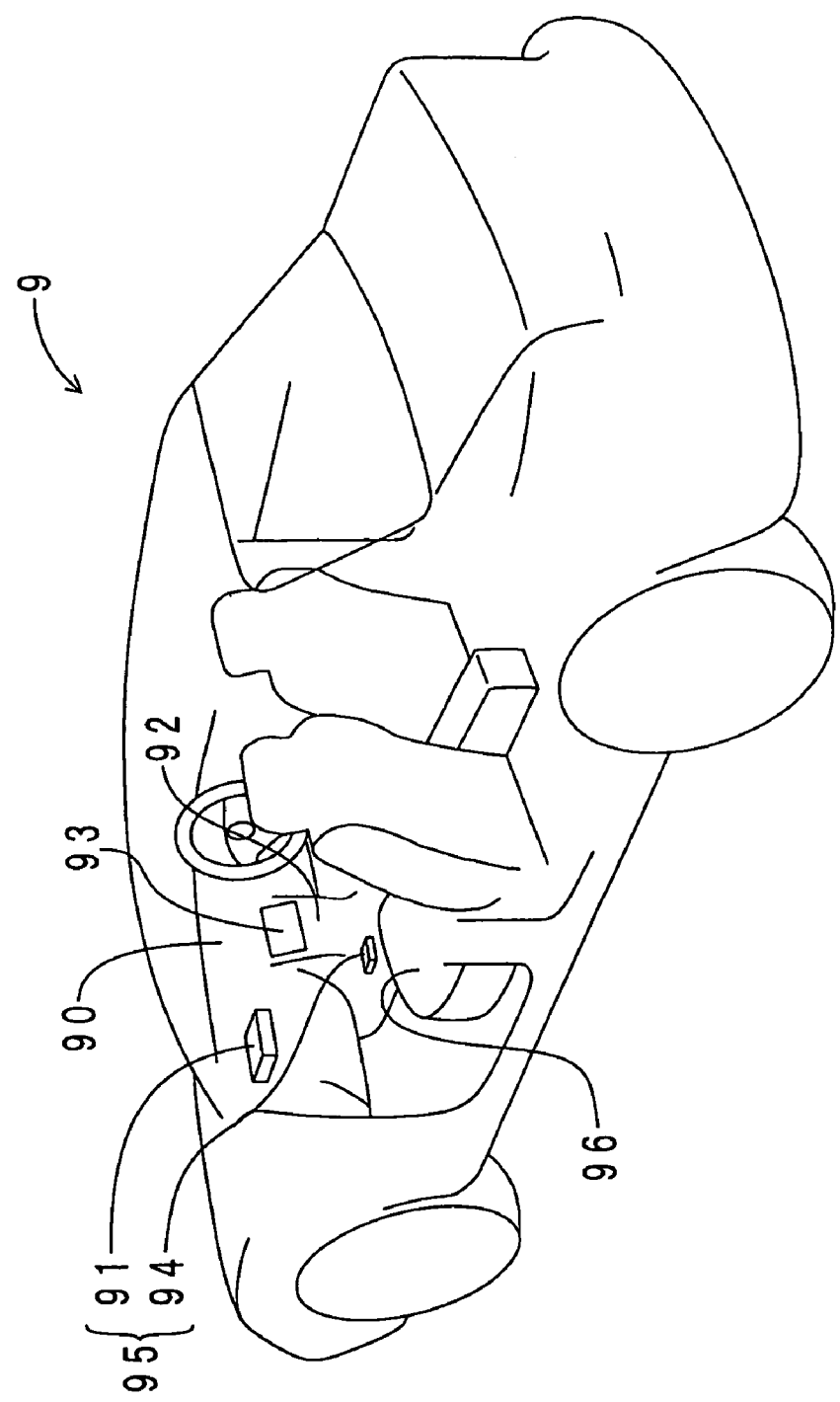
FIG. 1 is a schematic view of a vehicle I which an occupant detection system is installed according to an embodiment of the present invention.
Figure 2:
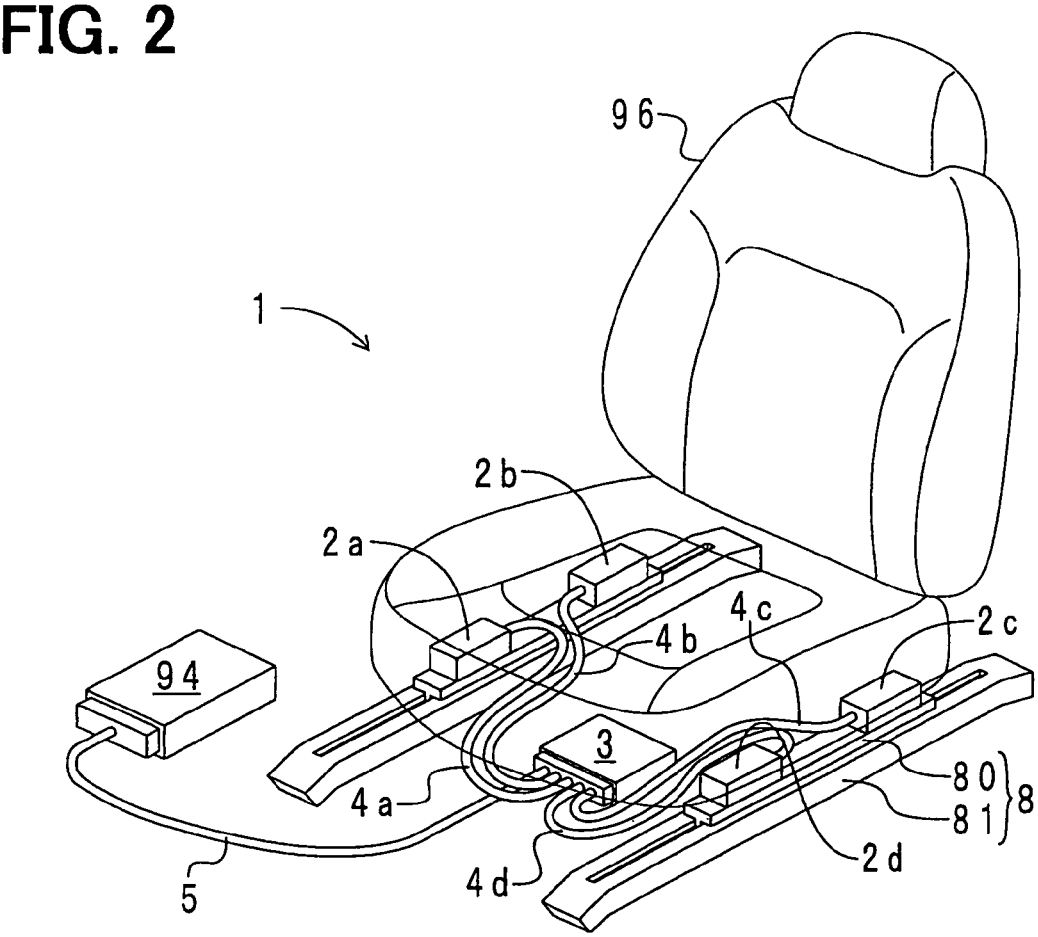
FIG. 2 is a perspective view of a seat assembly to which the occupant detection system is attached according to the embodiment.

Referring to FIGS. 1 and 2, an occupant detection system 1 is installed in a vehicle 9 for determining occupancy status of a passenger seat 96 of the vehicle 9. The occupant detection system 1 classifies the seat 96 as empty or occupied, or an occupant of the seat 96 as an adult or child. In the vehicle 9, an airbag 91 is folded and stored in an instrument panel 90 on a passenger side. A display 93, which is a part of a warning device, is installed in an upper portion of a center cluster 92 of the instrument panel 90. An airbag ECU 94 is installed in a lower portion of the center cluster 92. The airbag 91 and the airbag ECU 94 are included in an airbag system 95 that is a part of a passive safety system.

Seat rails 8 are arranged parallel to each other and apart from each other in the side-to-side direction of the vehicle 9. Each seat rail 8 includes an upper rail 80 and a lower rail 81. The lower rail 81 is fixed to a vehicle floor (not shown) and the upper rail 80 is attached to the lower rail 81 such that it can slide on the lower rail 81 in the front-to-rear direction of the vehicle 9. The passenger seat 96 is assembled such that it can slide with the upper rail 80 in the front-to-rear direction of the vehicle 9. Load sensors 2a, 2b, 2c, 2d are installed between seat frames (not shown) of the seat 96 and the upper rail 80 for measuring loads applied to the seat 96. The load sensors 2a, 2b, 2c, 2d are arranged adjacent to four corners of a seat cushion of the seat 96.

An occupant detection ECU 3 is arranged on the floor between the two seat rails 8 and underneath the seat 96. The load sensors 2a, 2b, 2c, 2d are connected with the occupant detection ECU 3 via sensor wire harnesses 4a, 4b, 4c, 4d, respectively. The wire harnesses 4a, 4b, 4c, 4d are constructed of signal lines and power supply lines. The occupant detection ECU 3 and the airbag ECU 94 are connected with each other via an inter-ECU wire harness 5. The occupant detection system 1 includes the load sensors 2a, 2b, 2c, 2d, the occupant ECU 3, and the sensor wirer harnessed 4a, 4b, 4c, 4d.

Figure 3:
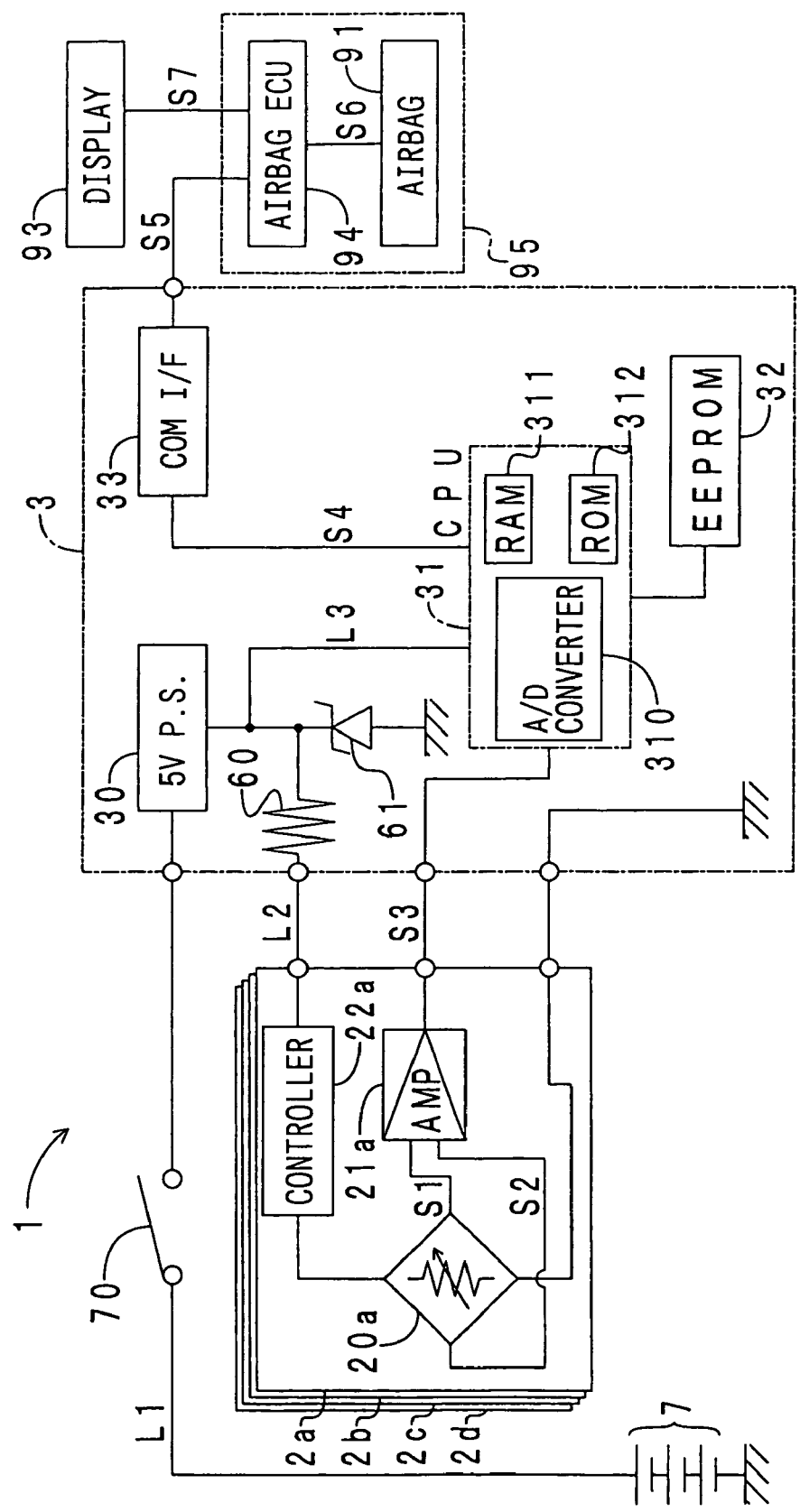
FIG. 3 is a block diagram of the occupant detection system according to the embodiment.

Referring to FIG. 3, the load sensor 2a has a gage 20a, an amplifier 21a, and a controller 22a. A strain gage (not shown) provided in the gage 20a forms a bridge circuit. The amplifier 21a amplifies a voltage signal inputted from the gage 20a. The controller 22a adjusts a gain of the amplifier 21a so that the amplifier 21a has liner output characteristics. The load sensors 2b, 2c, 2d are configured in the same manner as the load sensor 2a and therefore their configuration and operation will not be discussed.

The occupant detection ECU 3 includes a 5-V power supply 30, a CPU 31, an EEPROM 32, and a communication interface (I/F). The 5-V power supply 30, which is included in a power supply section of the occupant detection system 1, converts a 12-volt voltage of a battery 7 to a 5-volt constant voltage. The CPU 31, which is included in a determination section of the occupant detection system 1, includes an analog-to-digital (A/D) converter 310, a RAM 311, and a ROM 312. Guaranteed voltage of the CPU 31 and a CMOS IC (not shown) in used in the occupant detection ECU 3 are set at seven volts. The A/D converter 310 converts an analog voltage signal inputted from the amplifier 21a into a digital voltage signal. Data on the digital voltage signal is temporarily stored in the RAM 311. A program for an occupant detecting process is written in the ROM 312 in advance. The EEPROM 32 is provided for storing information on errors, if they occur in the load sensor 2a. The EEPROM 32 electrically erases the information and overwrites with other information. The communication I/F 33, which is included in a communication section, transmits a result of the occupant determination to the airbag system 95.

The 5-V power supply 30 is connected with the battery 7 via a batter power supply line L1. An ignition switch 70 is connected in the battery power supply line L1. A sensor power supply line L2 is connected between the 5-V power supply 30 and the controller 22a for supplying power to the load sensor 2a. A 1-Ω resistor 60 is connected in the sensor power supply line L2. A zener diode 61 having a breakdown voltage $V_D$ of 6V is connected between the sensor power supply line L2 and an ECU internal power supply line L3 through branch connection. The 5-V power supply 30 is connected to the CPU 31 via the internal power supply line L3.

A high voltage of 12V is applied to the 5V-power supply 30 by the battery 7 via the battery power supply line L1 when the ignition switch 70 is closed. The power supply voltage of 5V converted from the 12V voltage is applied to the load sensors 2a, 2b, 2c, 2d via the sensor power supply line L2. Since the breakdown voltage $V_D$ of the zener diode 61 is 6V, no current flows into the zener diode 61. The 5V power supply voltage is also applied to the CPU 31 via the internal power supply line L3. Namely, power is supplied from the 5V-power supply 30 to the load sensors 2a, 2b, 2c, 2d and the CPU 31.

The gage 20a is connected to the amplifier 21a via signal lines S1, S2. The amplifier 21a is connected to the CPU 31 via a signal line S3. The CPU 31 is connected to the communication I/F 33 via a signal line S4. The communication I/F 33 is connected to the airbag ECU 94 via a signal line S5. The airbag ECU 94 is connected to the airbag 91 via a signal line S6. The airbag 94 is connected to the display 93 via a signal line S7.

A constant voltage is applied to the strain gage of the gage 20a. A resistance of the strain gage varies when a load is applied to the load sensor 2a. As a result, a balance of the bridge circuit is altered and a small voltage is measured at the gage 20a. A signal indicating the small voltage is transmitted from the gage 20a to the amplifier 21a via the signal lines S1, S2. The signal is amplified by the amplifier 21a and transmitted to the A/D converter 310 via the signal line S3. The A/D converter 310 converts the analog signal inputted from the amplifier 21a to a digital signal. It also receives analog signals from the load sensors 2a, 2b, 2c, 2d, and converts them to digital signals. Data including values related to the digital signals converted from the analog signals of the load sensors 2a, 2b, 2c, 2d is temporarily stored in the RAM 311.

The CPU 31 reads the data out of the RAM 311 and calculates a sum total of the values contained in the data. It compares the sum total with the first and the second thresholds th1, th2 stored in the ROM 312 and determines occupancy status of the seat 96. The second threshold th2 is a threshold for determining an occupant of the seat 96 is a child or an adult. The CPU 31 determines that the seat 96 is empty when the sum total is equal to or lower than the first threshold th1. It determines that the seat 96 is occupied by a child when the sum total is between the first threshold th1 and the second threshold th2. It determines that the seat 96 is occupied by an adult when the sum total is higher than the second threshold th2.

The determination result is transmitted to the airbag ECU 94 via the signal line S4, the communication I/F 33, and the signal line S5. The airbag ECU 94 issues an instruction signal to the airbag 91 via the signal line S6 based on the determination result. For instance, the airbag ECU 94 issues an instruction signal so that the airbag 91 does not inflate when the occupant of the seat 96 is determined as a child. The airbag ECU 94 issues an instruction signal so that the airbag 91 inflates when the occupant of the seat 96 is determined as an adult.

Figure 4A:
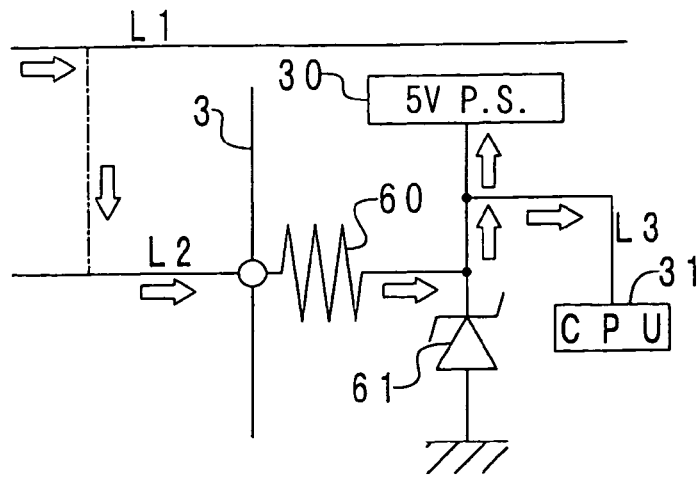
FIG. 4A is a circuit diagram of the occupant detection system with arrows indicating current flow when a short is present according to the embodiment.

A wire harness (not shown) connected to the battery 7 and a sensor wire harness 4a may be caught between the upper rail 80 and the lower rail 81 when the seat 96 is slid. In such a case, the battery power supply line L1 in the battery wire harness L1 and the sensor power supply line L2 in the sensor wire harness become short. A current flows from the battery power supply line L1 to the sensor power supply line L2 as indicated with alternate long and short dashed lines in FIG. 4A. Namely, an excess voltage is applied to the sensor power supply line L2 because the voltage (5V) at the sensor power supply line L2 is seven volts lower than the battery power supply line L1 (12V). As a result, a large amount of current flows into the 5V-power supply 30 and the CPU 31 via the resistor 60.

Figure 5:
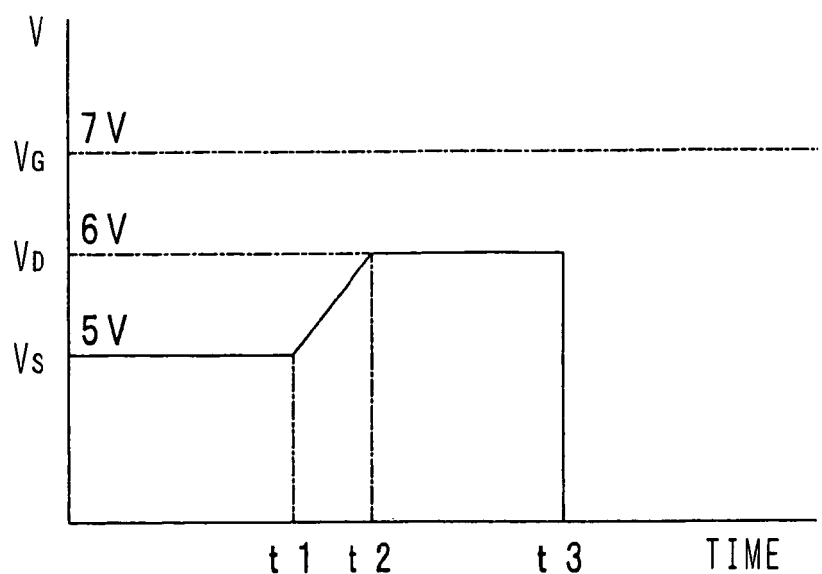
FIG. 5 is a graph showing variations in voltages when a short is present in an occupant detection ECU according to the embodiment.
Figure 4B:
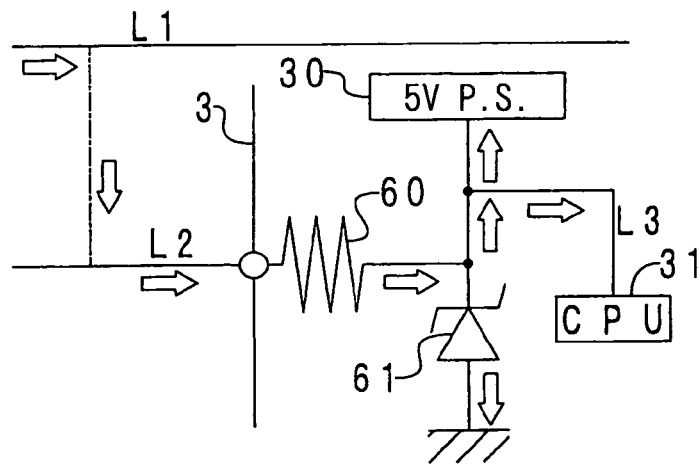
FIG. 4B is a circuit diagram of the occupant detection system with arrows indicating current flow when a short is present according to the embodiment.
Figure 4C:
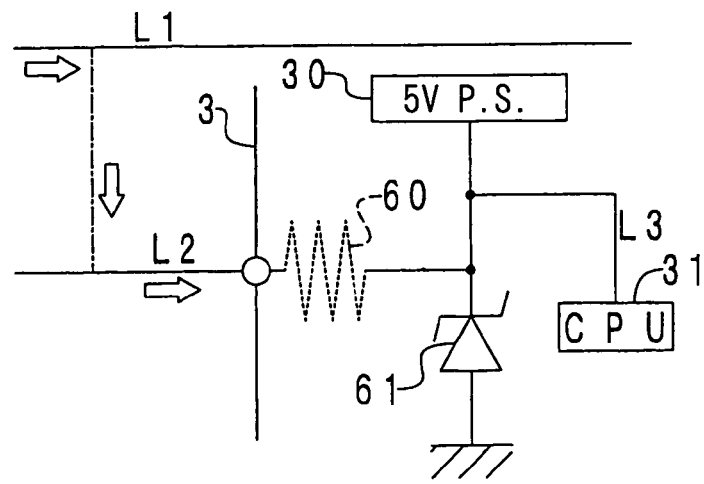
FIG. 4C is a circuit diagram of the occupant detection system with arrow indicating current flow when an open is present according to the embodiment.
Figure 6:
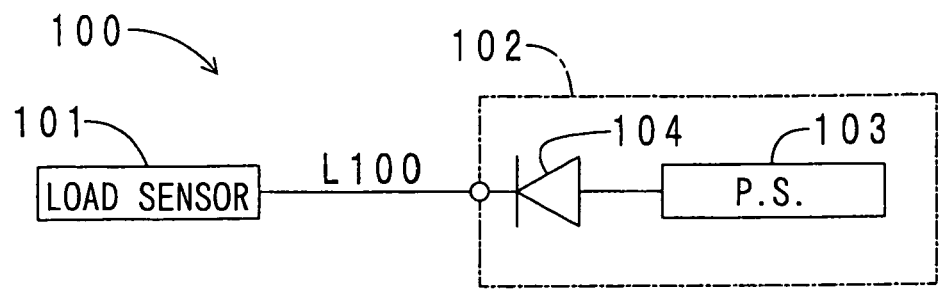
FIG. 6 is a block diagram of an occupant detection system according to a related art.
Figure 7:
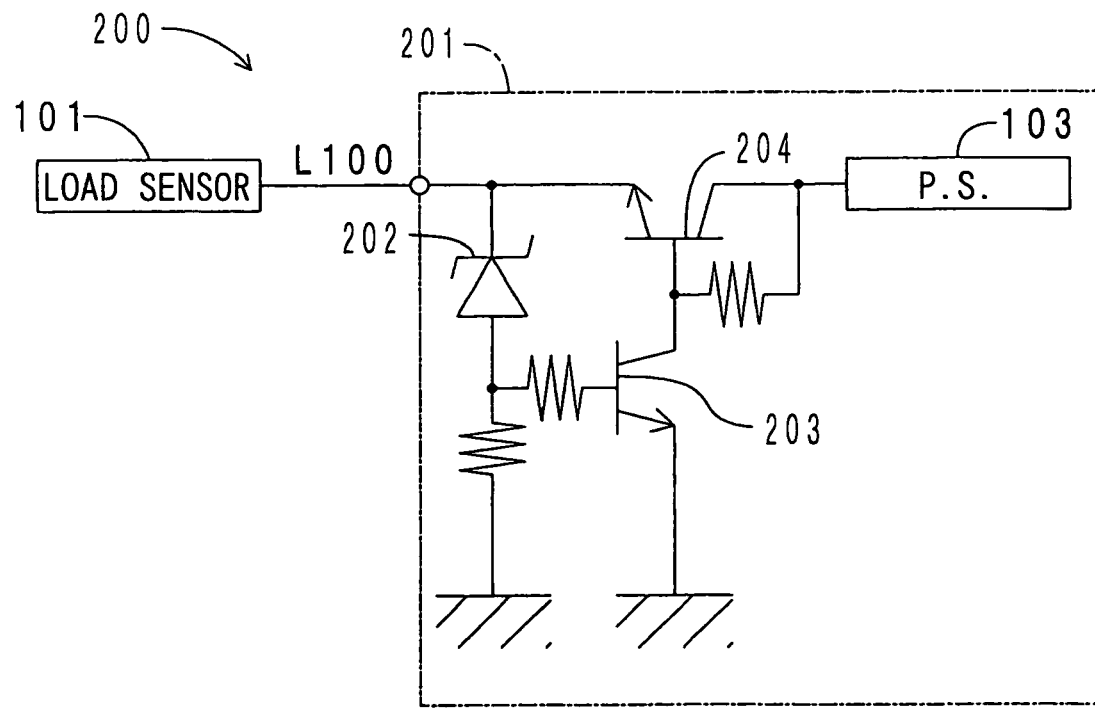
FIG. 7 is a block diagram of an occupant detection system according to a related art.

A voltage applied to the occupant detection ECU 3 increases immediately after the occurrence of the short between battery power supply line L1 and the sensor power supply line L2 (time t1) as shown in FIG. 5. A temperature of the resistor 60 starts rising. A current starts flowing into the zener diode 61 as indicated with a white arrow in FIG. 4B when the voltage applied to the occupant detection ECU 3 reaches 6V, which is the breakdown voltage $V_D$ of the zener diode 61. Thus, the voltage applied to the occupant detection ECU 3 is maintained at 6V after time t2 at which the voltage reaches the breakdown voltage $V_D$. Namely, voltages of the CPU 31 and the CMOS IC used in the occupant detection ECU 3 are maintained lower than a guaranteed voltage $V_G$ of 7V. The excess voltage is not applied to the occupant detection ECU 3 after time t3 when the resistor 60 becomes short due to the heat as shown in FIG. 4C at time t3. The load sensors 2a, 2b, 2c, 2d stop operating when the resistor 60 becomes short. Information regarding a short of the resistor 60 is transmitted from the CPU 31 to the display 93 via the signal line S4, the communication I/F 33, the signal line S5, the airbag ECU 94, and signal line S7. Then, warning information indicating a malfunction in the load sensor 2a, 2b, 2c, 2d is displayed on the display 93.

A power supply voltage is applied to the load sensors 2a, 2b, 2c, 2d by the 5V-power supply 30 via the sensor power supply line L2 in a normal condition. The dynamic range of the load sensors 2a, 2b, 2c, 2d is not affected by the resistor 60 because the resistance of the resistor 60 is 1 Ω, which is relatively small. Namely, the accuracy in the load measurement is not affected by the resistor 60. Therefore, the accuracy in the load measurement is maintained at a relatively high level in a normal condition. Moreover, the power supply voltage is not clamped by the zener diode 61 in a normal condition because the breakdown voltage $V_D$ is set at 6V that is higher than the power supply voltage (5V).

A large amount of current flows into the zener diode 61 via the sensor power supply line L2 and the resistor 60 when the short occurs. The breakdown voltage $V_D$ is set lower than the guaranteed voltage $V_G$ of the CPU 31 and the CMOS IC. Thus, an excess voltage higher than the guaranteed voltage $V_G$ is not applied to the occupant detection ECU 3. Furthermore, the resistor 60 becomes open because of an excessive current. As a result, the excess voltage is not applied to the occupant detection ECU 3 after the resistor 60 becomes open. With this configuration, the occupant detection ECU 3 is protected when the short occurs.

The display 93 provides visual warning information when the sensor power supply line L2 or the resistor 60 becomes open and a malfunction of the load sensor 2a, 2b, 2c, 2d is detected. The information on the malfunction of the load sensor 2a, 2b, 2c, 2d is transmitted to the airbag system 95 via the communication I/F 33 and the signal line S5.

Power is supplied to the A/D converter 310 and the load sensors 2a, 2b, 2c, 2d by a common 5V-power supply, that is, the 5V-power supply 30. Therefore, variations in the power supply voltage are less affected to the load measurement and the load measurement is performed with high accuracy. The load sensors 2a, 2b, 2c, 2d are arranged outside the power supply section. Therefore, the sizes and the manufacturing costs of the load sensors 2a, 2b, 2c, 2d can be reduced.

The communication I/F 33 transmits instruction signals and warning signals and a warning device of the occupant detection system 1 provides warning information related to the malfunction of the sensors 2a, 2b, 2c, 2d. Furthermore, a display of a navigation system is used for the display 93. Thus, large numbers of electrical components and wires are not required for the occupant detection system 1 in comparison with a system in which a warning device exclusive for an open detection of the resistor 60 is provided.

The present invention should not be limited to the embodiment previously discussed and shown in the figures, but may be implemented in various ways without departing from the spirit of the invention. For example, an indicator may be arranged in a meter cluster for providing a warning. Alternatively, a warning device that provides an audio warning may be used. The breakdown voltage VD and the resistance can be set to a voltage and a resistance other than 6V and 1Ω, respectively. They can be set to appropriate voltage and resistance based on the battery voltage, the guaranteed voltages $V_G$ and the power supply voltage.

A communication section for a warning device may be provided and connected to the display 93. A seatbelt pretensioner may be applied to the passive safety system. A fuse can be used instead of the resistor 60.

What is claimed is:

1. An occupant detection system comprising:
   a load sensor that measures a load applied to a seat of a vehicle; and
   an electronic control unit having a determination section that determines occupancy status of the seat based on a result of the load measurement, a power supply section that supplies power to the load sensor and the determination section with a power supply voltage lower than a battery voltage of the vehicle, and a communication section that sends a result of the occupancy status determination to an external device, wherein,
   the load sensor and the power supply section are electrically connected with each other via a sensor power supply line in which a resistor having a specific resistance is connected,
   the specific resistance is predetermined so that the resistor becomes open when a short occurs and does not affect to a dynamic range of the load sensor,
   the power supply section and the resistor are electrically connected with each other via an internal power supply line to which a zener diode having a specific breakdown voltage is connected through branch connection, and
   the specific breakdown voltage is predetermined between the power supply voltage and a guaranteed voltage of the electronic control unit.

2. The occupant detection system according to claim 1, wherein the electronic control unit is arranged under the seat.

3. The occupant detection system according to claim 1, wherein:
   the electronic control unit further includes a warning transmission section that is electrically connected to an external warning device that provides a warning to a user; and
   the warning transmission section sends a warning signal indicating an open of the resistor to the external warning device when the resistor becomes open.

4. The occupant detection system according to claim 1, wherein the communication section is electrically connected to an external warning device that provides a warning to a user for sending a warning signal indicating an open of the resistor to the external warning device when the resistor becomes open.

5. The occupant detection system according to claim 4, wherein the external warning device is a display included in a vehicle navigation system.

6. The occupant detection system according to claim 1, wherein the external device is a passive safety system.

7. The occupant detection system according to claim 6, wherein the external warning device is a display included in a vehicle navigation system.

* * * * *